(12) United States Patent
Wentz et al.

(10) Patent No.: US 12,137,636 B1
(45) Date of Patent: Nov. 12, 2024

(54) IMPLEMENT FOR MOVING PLANT MATERIAL IN A FIELD

(71) Applicants: Ethen D. Wentz, Menno, SD (US); Daniel L. Crick, Menno, SD (US)

(72) Inventors: Ethen D. Wentz, Menno, SD (US); Daniel L. Crick, Menno, SD (US)

(73) Assignee: Fair Manufacturing, Inc., Yankton, SD (US)

( * ) Notice: Subject to any disclaimer, the term of this patent is extended or adjusted under 35 U.S.C. 154(b) by 822 days.

(21) Appl. No.: 17/138,337

(22) Filed: Dec. 30, 2020

Related U.S. Application Data

(60) Provisional application No. 62/960,919, filed on Jan. 14, 2020.

(51) Int. Cl.
| | |
|---|---|
| *A01D 80/00* | (2006.01) |
| *A01D 57/12* | (2006.01) |
| *A01D 78/00* | (2006.01) |
| *A01D 78/14* | (2006.01) |

(52) U.S. Cl.
CPC ............ *A01D 80/00* (2013.01); *A01D 57/12* (2013.01); *A01D 78/006* (2013.01); *A01D 78/146* (2013.01)

(58) Field of Classification Search
CPC .... A01D 80/00; A01D 78/006; A01D 78/146; A01D 57/12
See application file for complete search history.

(56) References Cited

U.S. PATENT DOCUMENTS

| 392,705 | A | * | 11/1888 | Wickey | ................ | A01D 78/148 |
|---|---|---|---|---|---|---|
| | | | | | | 56/366 |
| 2,226,100 | A | * | 12/1940 | Larison | .................... | B60G 5/02 |
| | | | | | | 280/81.1 |
| 2,349,289 | A | * | 5/1944 | Larison | .................... | B60G 5/02 |
| | | | | | | 280/685 |

(Continued)

FOREIGN PATENT DOCUMENTS

AU      2014240333 A1 *  4/2016

OTHER PUBLICATIONS

Acrobat Rake/Swathturner HKX 620, Vicon, brochure, 2 pages.
Acrobat High Capacity Rake and Swathturner, Vicon Farm Machinery, Norfolk, Virginia, 4 pages.

*Primary Examiner* — Thomas B Will
*Assistant Examiner* — Julia C Tran
(74) *Attorney, Agent, or Firm* — Jeffrey A. Proehl; Woods, Fuller, Shultz & Smith, PC

(57) ABSTRACT

An implement for moving plant material lying in a field including a frame, a plurality of rake wheels rotatably mounted on the frame, and a plurality of support wheels to support the frame in an elevated condition. The implement may have a plurality of configurations, and may include a merge configuration configured to merge windrows of plant material on the field surface by lateral displacement of the plant material on the field surface. The plurality of configurations may include a turn configuration configured to turn the plant material on the field surface with a degree of lateral movement of the plant material on the field surface. The plurality of configurations may include a fluff configuration configured to lift plant material off of the field surface without lateral displacement of the plant material on the field surface.

21 Claims, 7 Drawing Sheets

(56) References Cited

U.S. PATENT DOCUMENTS

| | | | |
|---|---|---|---|
| 2,411,885 A * | 12/1946 | Larison | B60G 5/053 |
| | | | 280/686 |
| 2,559,862 A * | 7/1951 | Ferguson | A01D 78/02 |
| | | | 56/372 |
| 2,966,773 A | 1/1961 | Lely | |
| 3,077,067 A | 2/1963 | Lely | |
| 3,910,019 A | 10/1975 | Schlittler | |
| 4,026,093 A | 5/1977 | Knusting | |
| 4,047,370 A | 9/1977 | Eve | |
| 4,343,142 A * | 8/1982 | Allen | A01D 78/006 |
| | | | 56/11.9 |
| 4,524,575 A * | 6/1985 | Nilsen | A01D 84/00 |
| | | | 56/372 |
| 4,524,576 A * | 6/1985 | Probst | A01D 84/00 |
| | | | 56/364 |
| 4,723,402 A * | 2/1988 | Webster | A01D 78/146 |
| | | | 56/15.5 |
| 4,922,699 A | 5/1990 | Gantzer | |
| 4,932,197 A * | 6/1990 | Allen | A01D 78/146 |
| | | | 56/228 |
| 5,065,570 A * | 11/1991 | Kuehn | A01D 78/001 |
| | | | 56/379 |
| 5,960,620 A | 10/1999 | Wright | |
| 5,966,916 A * | 10/1999 | Laing | A01D 78/146 |
| | | | 56/341 |
| 6,834,488 B2 | 12/2004 | Menichetti | |
| 6,959,531 B2 | 11/2005 | Magnini | |
| 7,076,938 B2 | 7/2006 | Tonutti | |
| 8,001,755 B2 * | 8/2011 | Menichetti | A01D 78/144 |
| | | | 56/228 |
| 8,146,338 B1 | 4/2012 | Cicci | |
| 8,474,232 B2 | 7/2013 | Peden | |
| 10,499,567 B2 * | 12/2019 | Schiferl | A01D 78/14 |
| 2005/0055995 A1 * | 3/2005 | Kappel | A01D 78/146 |
| | | | 56/375 |
| 2005/0284126 A1 * | 12/2005 | Giovannini | A01D 78/144 |
| | | | 56/377 |
| 2009/0085328 A1 * | 4/2009 | Moyna | B60C 11/02 |
| | | | 280/677 |
| 2010/0251686 A1 | 10/2010 | Giovannini | |
| 2015/0237801 A1 * | 8/2015 | Giovannini | A01D 78/14 |
| | | | 56/381 |
| 2016/0242359 A1 * | 8/2016 | Jordan | A01D 78/1014 |
| 2019/0343050 A1 * | 11/2019 | Bishop | A01D 80/02 |

* cited by examiner

IMPLEMENT FOR MOVING PLANT MATERIAL IN A FIELD

REFERENCE TO RELATED APPLICATIONS

This application claims the benefit of the priority of U.S. Provisional Patent Application No. 62/960,919 filed Jan. 14, 2020, which is hereby incorporated by reference in its entirety.

BACKGROUND

Field

The present disclosure relates to a making apparatus and more particularly pertains to a new implement for moving plant material in a field to provide enhanced versatility in the types of movement of plant material provided by a single apparatus.

SUMMARY

In one aspect, the present disclosure relates to an implement for moving plant material lying in a field, with the implement having a central longitudinal axis oriented substantially parallel to a forward movement direction of the implement. The implement may include a frame, a plurality of rake wheels configured to engage plant material lying in the field upon movement of the implement across the field, with each of the rake wheels having a plurality of substantially radially extending tines for engaging the plant materials and each of the rake wheels being rotatably mounted on the frame. The implement may also include a plurality of support wheels mounted on the frame to rest upon a field surface of the field to support the frame in an elevated condition above the field surface. The implement may have a plurality of configurations including a merge configuration configured to merge windrows of plant material on the field surface by lateral displacement of the plant material on the field surface. The plurality of configurations may include a turn configuration configured to turn the plant material on the field surface with a degree of lateral movement of the plant material on the field surface. The plurality of configurations may include a fluff configuration configured to lift plant material off of the field surface without lateral displacement of the plant material on the field surface.

In another aspect, the present disclosure relates to an implement for moving plant material lying in a field, with the implement having a central longitudinal axis oriented substantially parallel to a forward movement direction of the implement. The implement may comprise a frame and a plurality of rake wheels configured to engage plant material lying in the field upon movement of the implement across the field. Each of the rake wheels may have a plurality of substantially radially extending tines for engaging the plant materials and may be rotatably mounted on the frame. The implement may further include a plurality of support wheels mounted on the frame to rest upon a field surface of the field to support the frame in an elevated condition above the field surface, and a support wheel suspension structure suspending at least one of the support wheels on the frame. The support wheel suspension structure may include at least a walking beam and a damping element to reduce the magnitude of shock forces transmitted from the at least one support wheel to the frame.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
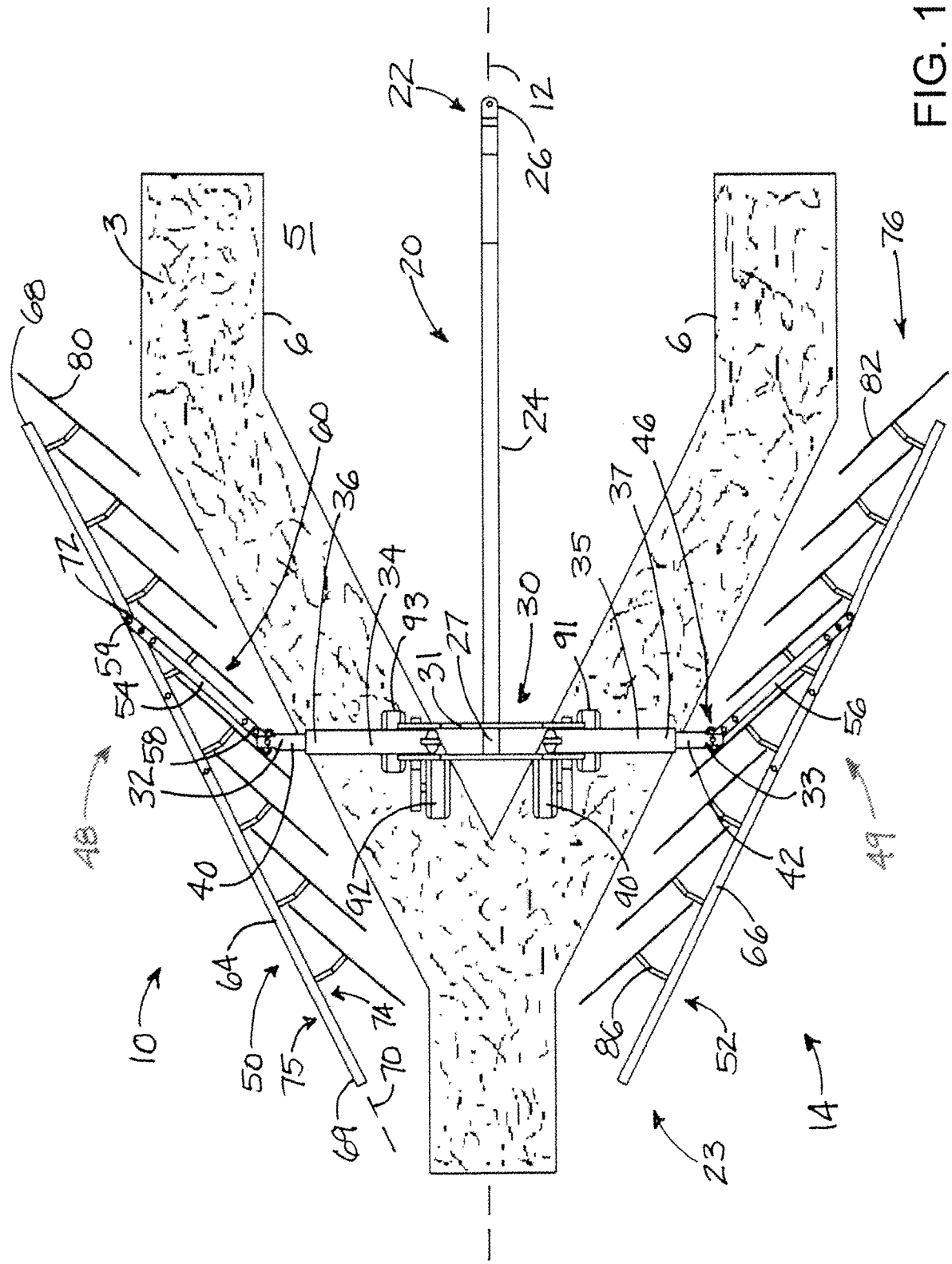
FIG. 1 is a schematic top view of a new implement for moving plant material in a field in a merge configuration, according to the present disclosure.
Figure 2:
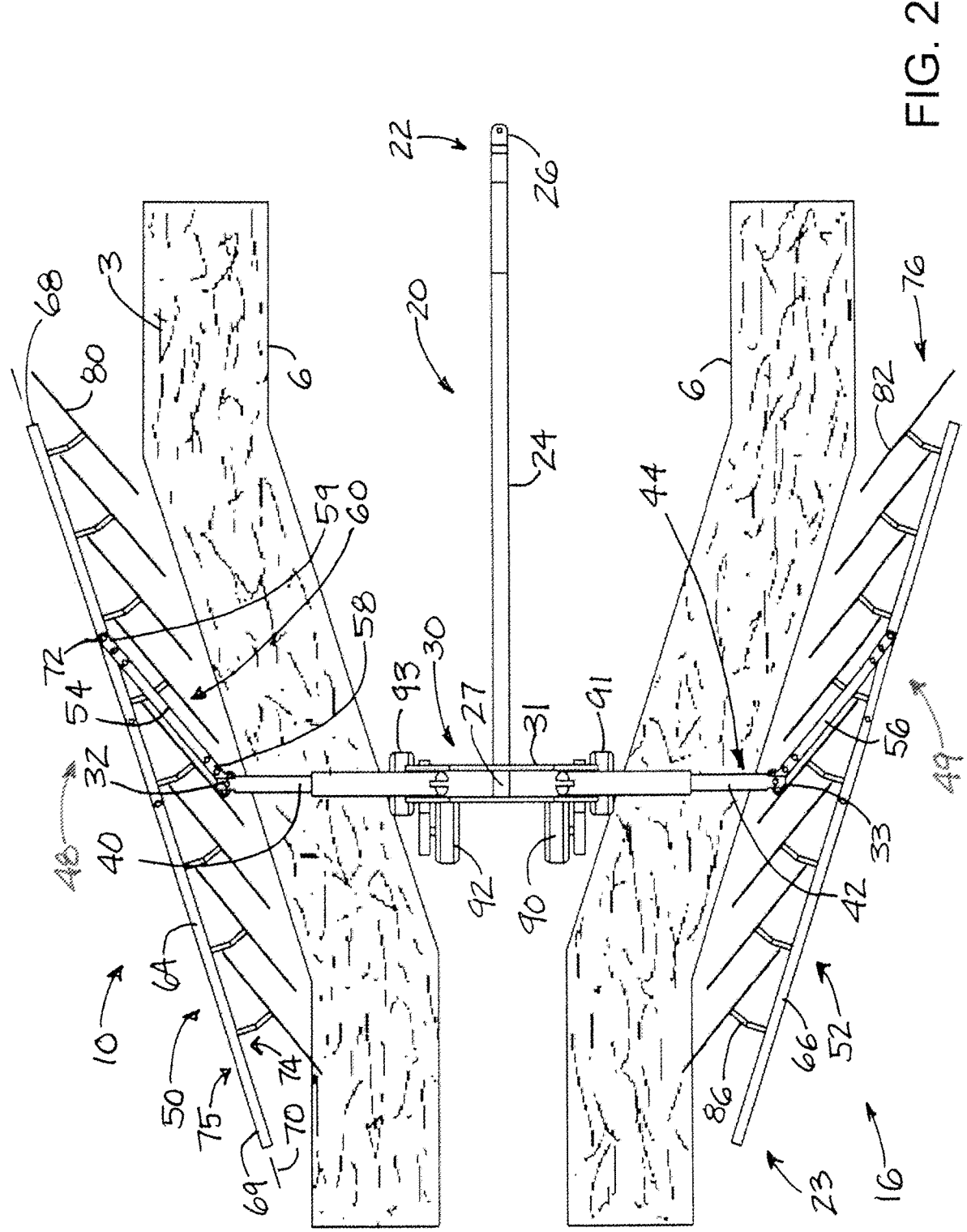
FIG. 2 is a schematic top view of the implement in a turn configuration, according to an illustrative embodiment.

With reference now to the drawings, and in particular to FIGS. 1 through 9 thereof, a new implement for moving plant material in a field embodying the principles and concepts of the disclosed subject matter will be described.

The production of the highest quality hay typically involves a number of steps after a major portion of the above ground plant has been cut or severed from the lower portion. The steps may typically include raking the cut plant material into a series of windrows across the field (either prior to or after an initial period of drying), moving the plant material situated in the windrows to promote further drying of the plant material, and eventually merging adjacent windrows together to facilitate bailing of the plant material into bales of the plant material suitable for transport and storage prior to usage of the hay.

Moving of the plant material to promote drying may include fluffing, or lifting into the air, the plant material (sometimes referred to as "tedding") without any substantial movement of the windrow of plant material on the field surface. Moving of the plant material may also include turning the plant material which involves moving the plant material in a manner that effectively shifts the position of the windrow of plant material in the field.

Typically these operations are performed by different types of equipment, and the applicants have recognized that the development of an apparatus capable of performing more than one of these operations is highly desirable for the benefits of lower overall equipment costs and convenience of equipment use and storage to the hay producer.

The applicants have thus developed an implement towable across an agricultural field which is capable of merging windrowed or non-windrowed plant material into a single windrow, turning the plant material in one or more windrows, and fluffing plant material in one or more windrows by a simple reconfiguration of the elements of the implement.

In one aspect, the disclosure relates to a system 1 for moving plant materials in a field, and includes an implement 10 which is highly suitable for moving plant material 3 in a field 4 in a manner which facilitates the natural processing of the plant material, such as the drying or loss of moisture from the plant material, after the plant material has been severed from lower portions of the plant and the ground and has been left to lie or rest upon the field surface 5 of the field. In general, the severed plant material is oriented substantially parallel to the field surface 5 when acted upon by the implement 10. It should be recognized that the plant material does not necessarily rest directly upon the surface of the soil of the field, and the reference to field surface 5 in this disclosure is intended to include not only the surface of the soil but also plant material which rests upon the stubble of the severed plants which remain rooted in the ground of the field.

In some implementations of the disclosure, the system 1 may include a towing vehicle 2 which may comprise an agricultural tractor or other vehicle suitable for towing an implement across the surface of the field. In utilizing the implement 10 to move plant material, the implement may be towed or drawn across the surface 5 of the field 4 by the towing vehicle 2 in a forward movement direction when the implement is being towed or pulled across the surface 5 of the field 4.

In embodiments, the elements of the implement 10 may have a plurality of configurations for providing different functionalities for different usages of the implement in moving the plant material on the field surface 5. In some embodiments, one configuration of the plurality of configurations may comprise a merge configuration 14 in which the implement functions to merge windrows 6 of plant material on the field surface by causing significant or substantial lateral displacement of the plant material on the field surface, such as is illustratively shown in FIG. 1. Such lateral movement of the plant material may tend to merge two or more laterally separated windrows into a single windrow to eliminate any gap between the pre-existing windrows.

Another configuration of the plurality of configurations may comprise a turn configuration 16 in which the implement functions to turn the plant material on the field surface, such as plant material in a windrow. In the turn configuration, the implement may move the plant material into laterally separated windrows 6 in a direction lateral to the central longitudinal axis in forward movement direction from a first lateral spacing of the windrows to a second lateral spacing of the windrows (see, e.g., FIG. 2). Typically, the first lateral spacing is greater than the second lateral spacing such that the separate windrows are brought closer together but not necessarily merged together.

Figure 3:
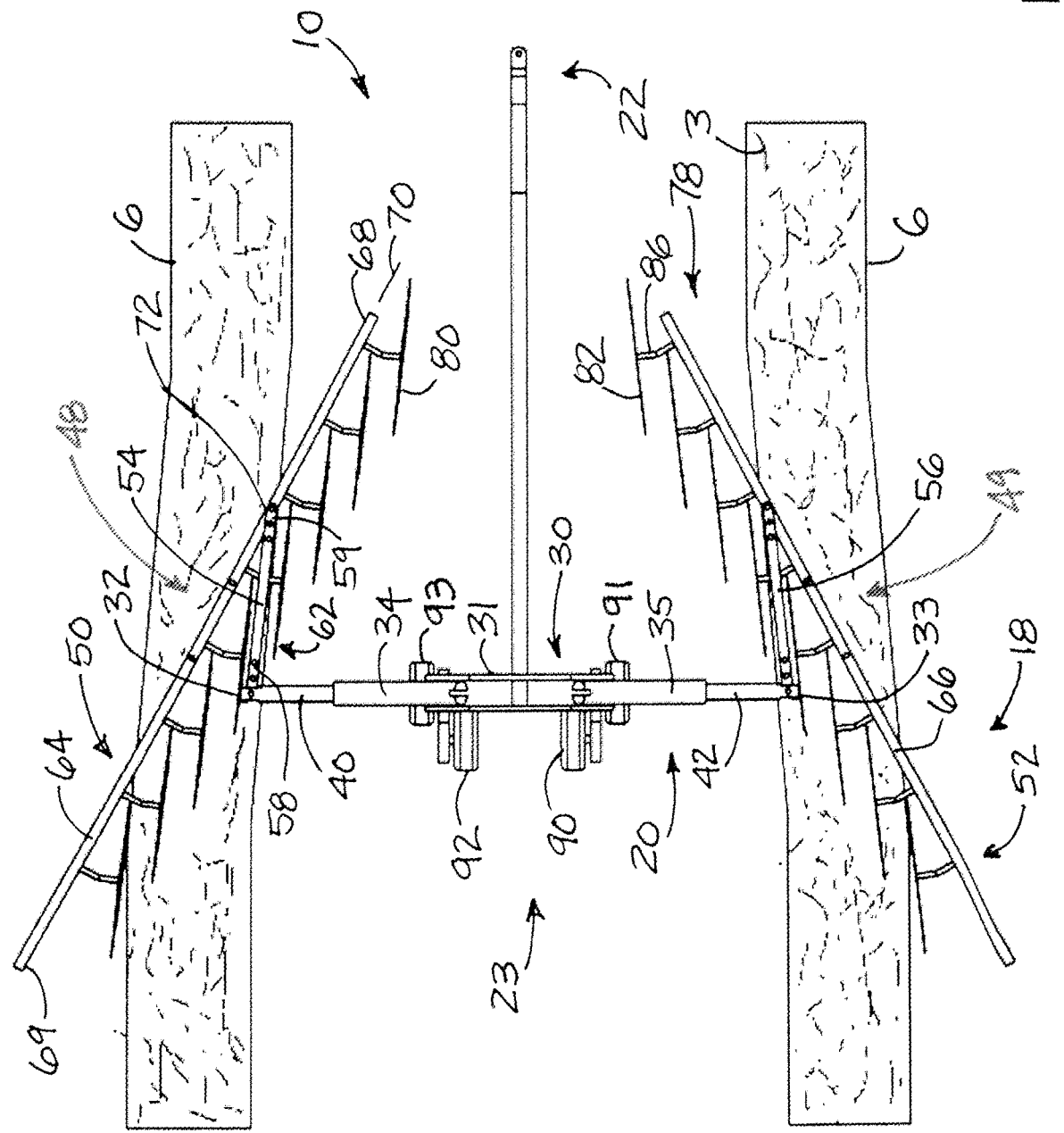
FIG. 3 is a schematic top view of the implement in a fluff configuration, according to an illustrative embodiment.
Figure 4:
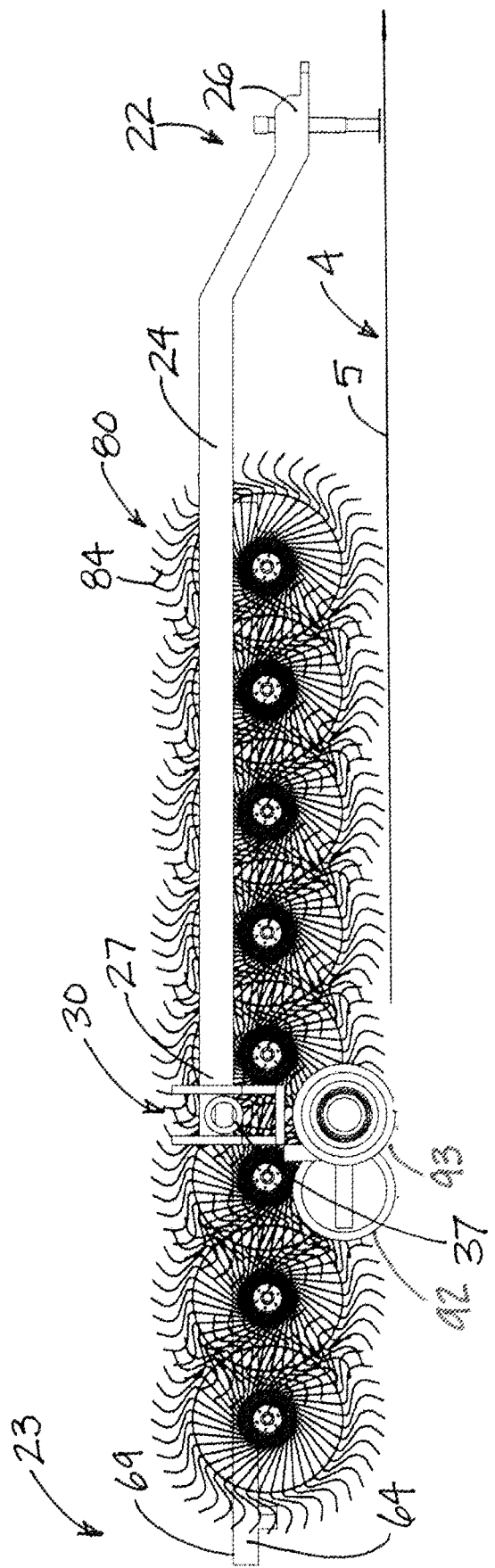
FIG. 4 is a schematic side sectional view of the implement, according to an illustrative embodiment.
Figure 5:
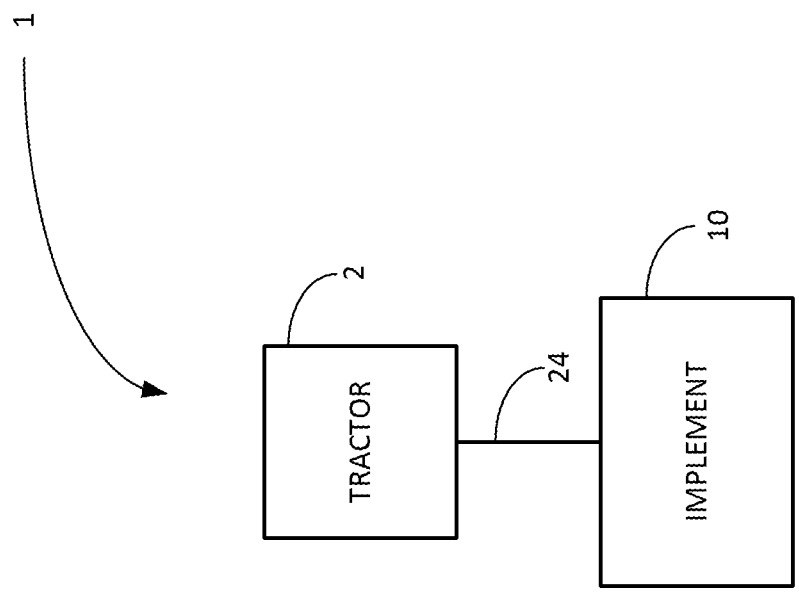
FIG. 5 is a schematic diagram of a system including the implement, according to an illustrative embodiment.
Figure 6:
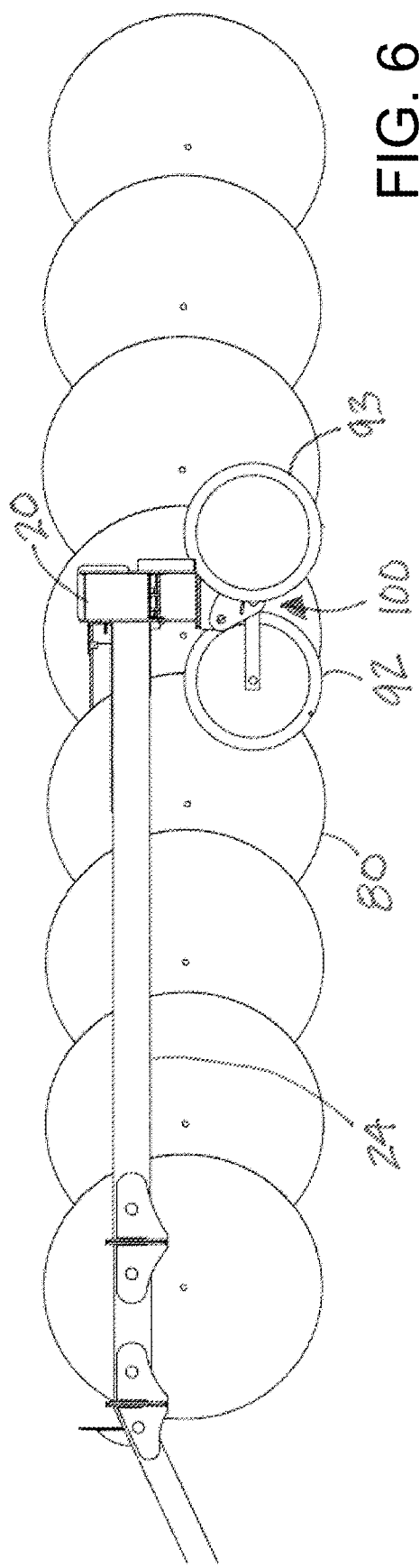
FIG. 6 is a schematic side view of the implement with an illustrative support wheel suspension structure, according to an illustrative embodiment.
Figure 7:
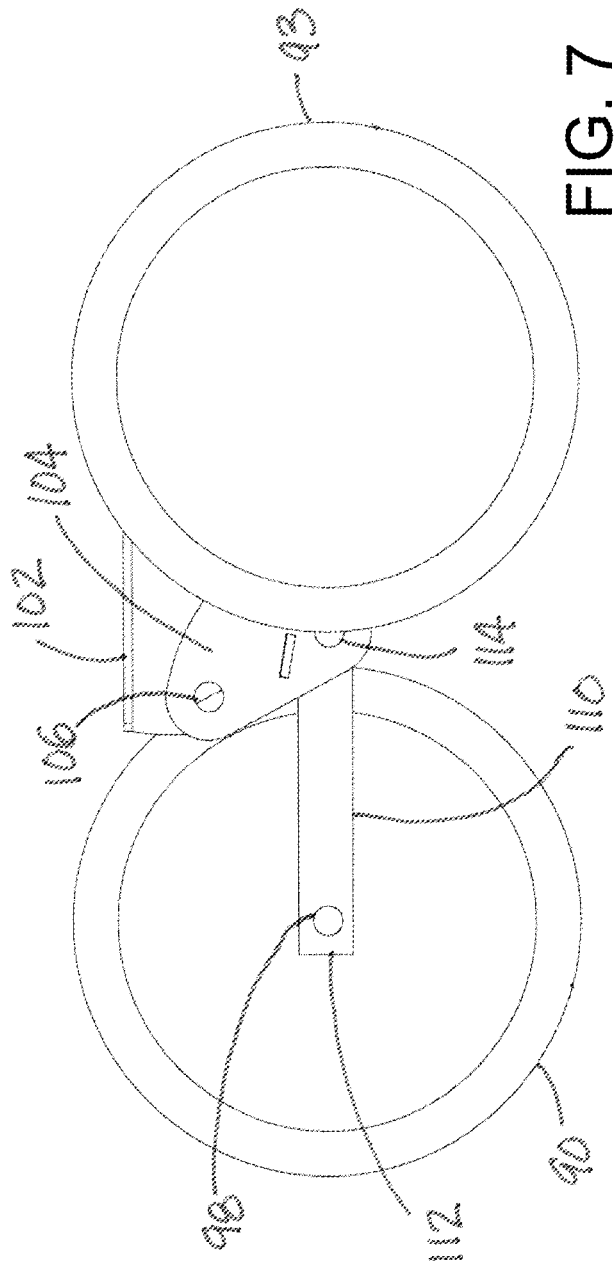
FIG. 7 is a schematic side view of the illustrative support wheel suspension structure isolated from other elements of the implement, according to an illustrative embodiment.
Figure 8:
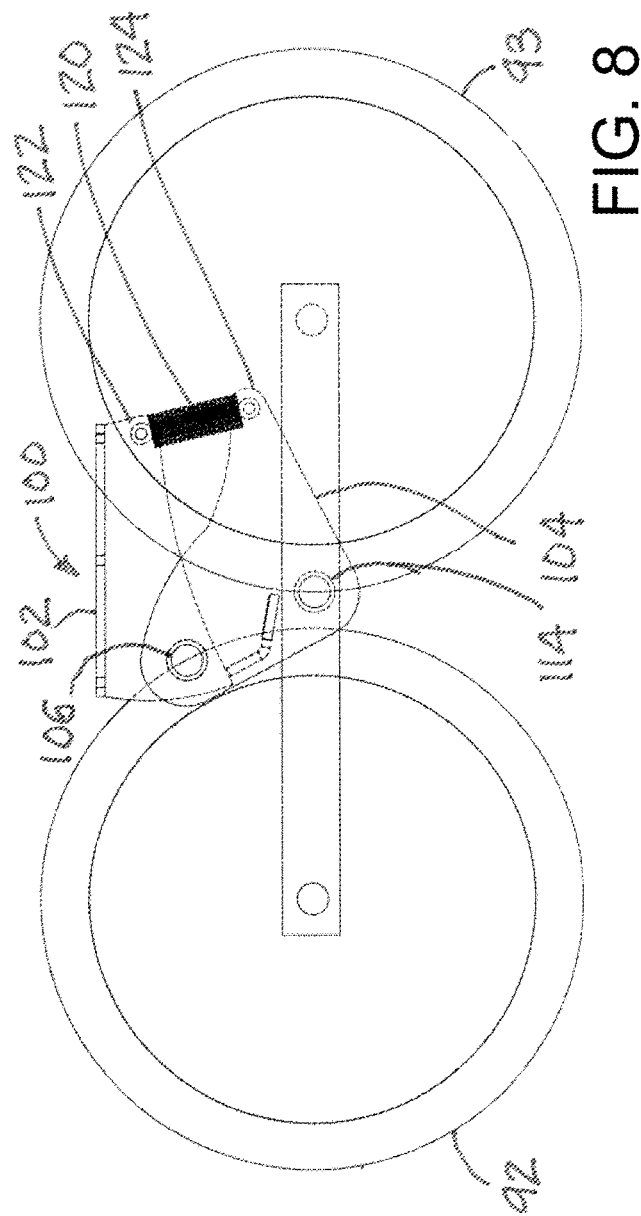
FIG. 8 is a schematic side view of the illustrative support wheel suspension structure with portions of the structure shown in phantom to illustrate detail of the structure, according to an illustrative embodiment.
Figure 9:
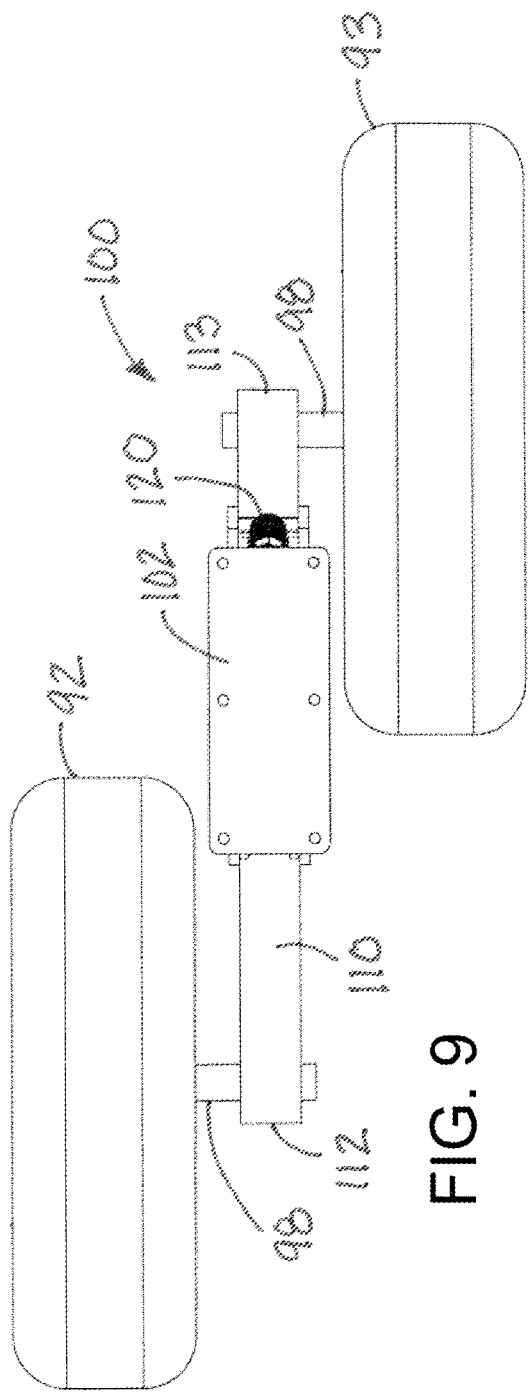
FIG. 9 is a schematic top view of the illustrative support wheel suspension structure isolated from other elements of the implement, according to an illustrative embodiment.

Yet another configuration of the plurality of configurations may comprise a fluff configuration 18 in which the implement functions to lift plant material off of the field surface 5 without significant lateral movement or displacement of the plant material with respect to the field surface in a direction lateral to the central longitudinal axis 12 of the implement (see, e.g., FIG. 3). The fluff configuration 18 may essentially preserve the positioning of windrows which existed prior to the implement passing over and engaging the plant material.

In the illustrative embodiments, the implement 10 may include a frame 20 which may have a front 22 which is generally oriented toward the normal forward direction of implement movement across the field, and also toward a towing vehicle 2 causing such movement. The frame 20 may also have a rear 23 which is generally oriented away from the front 22 and from any towing vehicle. In greater detail, the frame 20 may include a drawbar 24 which is removably connectable to a towing vehicle 2 for towing of the implement by the vehicle across the field surface 5. The drawbar 24 may have a front end 26 which is configured to hitch to the towing vehicle 2, and may have suitable hitching elements incorporated therein. The drawbar 24 may also have a rear end 27 which is located opposite of the front end 26. The drawbar may extend in a longitudinal direction which is substantially parallel to the central longitudinal axis 12, an orientation which may be maintained in each and all of the configurations of the implement 10. In some embodiments, the drawbar 24 may extend substantially along the central longitudinal axis 12 of the implement.

The frame 20 may further include a primary frame structure 30 which is connected to the drawbar 24 such that the drawbar extends forwardly from the primary frame structure, and the primary frame structure extends laterally with respect to the drawbar and the central longitudinal axis 12. The primary frame structure 30 may extend substantially perpendicular to the central longitudinal axis 12, and may be oriented substantially perpendicular to the central longitudinal axis. In some embodiments, the primary frame structure 30 may be fixed in a substantially perpendicular relationship to the drawbar 24 such that no movement of the primary frame structure relative to the drawbar is possible. The primary frame structure 30 may be fixed to the rear end 27 of the drawbar in a manner which restricts relative movement between the drawbar and the primary frame structure. The primary frame structure 30 may have opposite lateral ends 32, 33, and a distance between the ends 32, 33 may define a width of the primary frame structure. In some embodiments, movement of elements of the implement 10 that is required to change the implement from one of the configurations of the implement to another one of the configurations of the implement may not require vertical movement of the primary frame structure 30 such that the primary frame structure remains at substantially the same vertical level during movement of the elements of the implement 10 between the configurations of the implement.

In the illustrative embodiments, the primary frame structure 30 may include a central element 31 which may be generally laterally oriented with respect to axis 12 and the drawbar. The primary frame structure 30 may also include actuators 34, 35 which may be mounted on the central element 31 and which may extend in opposite lateral directions from the central element 31 in a linear arrangement. Each of the actuators 34, 35 may include inner actuator parts 36, 37 and outer actuator parts 40, 42. Illustratively, the inner actuator parts 36, 37 may comprise a cylinder of a hydraulic actuator, and the outer actuator parts 40, 42 may comprise a ram or piston of a hydraulic actuator. The outer actuator parts 40, 42 may thus be movable with respect to the inner actuator parts 36, 37 and the central element 31. The outer actuator parts 40, 42 of the actuators may be extendable and retractable with respect to the central longitudinal axis 12, and parts 40, 42 may be telescopically received in parts 36, 37.

The primary frame structure 30 may have at least two positions. These positions may include an extended position 44 (see, e.g., FIGS. 2 and 3), and a retracted position 46 (see, e.g., FIG. 4). The extended position of the primary frame structure may correspond to an extended width of the primary structure 30, while the retracted position of the primary frame structure may correspond to a retracted width of the structure 30. The extended width may be greater than the retracted width in the lateral direction. Adjustment of the width between the extended and retracted positions may be made to configure the apparatus to, for example, address the specific width of a windrow encountered in the field, and each of the extended and retracted conditions may be utilized in each of the configurations of the apparatus. For example, the retracted position of the primary frame structure may be utilized in the merge configuration of the implement 10 (see, e.g., FIG. 1). As another example, the extended position of the primary frame structure may be utilized in the turn configuration and the fluff configuration of the implement 10 (see. e.g., FIGS. 2 and 3). Other combinations of the extended and retracted positions and the merge, turn and fluff configurations may be utilized.

The implement 10 may have a pair of lateral material engagement assemblies 48, 49 that are positioned on opposite lateral sides of the central longitudinal axis 12. Each of the material engagement assemblies 48, 49 may be located on a respective lateral side of the central longitudinal axis, and the assemblies 48, 49 may optionally be position and/or oriented symmetrical to each other with respect to the axis 12. In some embodiments, each of the assemblies 48, 49 may be located entirely on one of the opposite lateral sides of the central longitudinal axis in at least one configuration, and may be so in each and all of the configurations of the implement. Portions of one or more of the material engagement assemblies 48, 49 may extend forwardly of the primary frame structure 30, and portions of one or more of the material engagement assemblies may extend rearwardly of the primary frame structure. in some embodiments, each of the material engagement assemblies 48, 49 may comprise a secondary frame structure and a plurality of rake wheels.

The frame 20 of the implement 10 may also include a pair of secondary frame structures 50, 52 which are mounted on the primary frame structure 30, and the secondary frame structures may be located at the lateral ends 32, 33 of structure 30. Each of the secondary frame structure 50, 52 may be movable with respect to the primary frame structure, and the primary frame structure 50, 52 may remain fixed with respect to the drawbar 24 and the central longitudinal axis 12. In some embodiments, movement of elements of the implement 10 that is required to change the implement 10 from one of the configurations of the implement to another one of the configurations does not require vertical movement of one or more of the secondary frame structures 50, 52 such that the secondary frame structure remains at substantially the same vertical level during movement of the elements of the implement between configurations of the implement.

One of the secondary frame structures 50 will be described with the understanding that both of the frame structures 50, 52 may have substantially identical elements and configurations. The secondary frame structures 50, 52 may each include an inner arm element 54, 56 which is mounted on the primary frame structure 30. The inner arm element 54 may be movably mounted on a respective lateral end 32 of the primary frame structure, and the inner arm element 54 may be pivotally mounted on a respective one of the outer actuator parts 40, 42 of the actuators of the primary frame structure The inner arm element 54 may be elongated with a first end 58 and a second end 59, and the first end 58 may be pivotally mounted on the primary frame structure 30 the second end 59 may be swingable in an arc with respect to the first end 58 when the inner arm element 54 is pivoted with respect to the primary frame structure 30. The inner arm element 54 may have a fixed length between the first 58 and second 59 ends.

The inner arm element 54 may have at least two positions which may include an outward position 60 (see, e.g., FIGS. 1 and 2) and an inward position 62 (see, e.g., FIG. 3). The inward position 62 may be characterized by the second end 59 of the inner arm element 54 being located relatively closer to the central longitudinal axis 12, and the outward position 60 may be characterized by the second end of the inner arm element being located relatively further away from the axis 12. The outward position 60 may correspond to the merge configuration of the implement, and may also correspond to the turn configuration of the implement. The inward position 62 may correspond to the fluff configuration of the implement.

Each of the secondary frame structures 50, 52 may also include a support element 64, 66 which is mounted on the primary frame structure 30 by a respective one of the inner arm elements 54, 56. The support element 64 may be movably mounted on the inner arm element 54 and may be pivotable with respect to the element 54. Support element 64 may be elongated with a forward end 68 and a rearward end 69, with a longitudinal axis 70 extending between the forward 68 and rearward 69 ends. The forward end 68 may be generally positioned toward the front 22 of the frame and the rearward end 69 may be positioned generally toward the rear 23 of the frame. The support element 64 may have at least one mounting point 72 located between the forward 68 and rearward 69 ends, and the second end 59 of the inner arm element may be mounted on the support element at the mounting point 72. The mounting point 72 may be located relatively closer to the forward end 68 than the rearward end 69. The support element 64 may have an inward side 74 and an outward side 75, with the inward side being oriented toward the central longitudinal axis 12 and the outward side being oriented away from the axis 12.

Each of the support elements 64, 66 may have at least two positions which may include an open position 76 (see, e.g., FIGS. 1 and 2) and a closed position 78 (see, e.g., FIG. 3). The closed position 78 may be characterized by the forward end 68 of the support element 64 being located relatively closer to the central longitudinal axis 12, and the open position 76 may be characterized by the forward end being located relatively further away from the axis 12. The closed position 78 may be characterized by the forward ends 68 of the support elements 64, 66 converging toward each other (and toward the drawbar 24) and the rearward ends 69 of the support elements diverging away from each other. The open position 76 may be characterized by the rearward ends 69 of the support elements converging toward each other and the forward ends 68 of the support elements diverging away from each other (and away from the drawbar 24), it's The open position may correspond to the merge configuration of the implement, and may also correspond to the turn configuration of the implement, while the closed position may correspond to the fluff configuration of the implement.

The implement 10 may also include a plurality of rake wheels 80, 82 which are configured to engage plant material 3 lying in the field 4 upon movement of the implement across the field and generally over the plant material. Each of the rake wheels 80, 82 may have a plurality of substantially radially extending tines 84 which engage the plant material and may have kinks or bends in the outermost portions of the tines such that those portions are not purely radial in orientation. Each of the rake wheels 80, 82 may be rotatably mounted on the secondary frame structure 50, 52, and multiple rake wheels may be mounted on each of the support elements 64, 66 at spaced locations along the lengths of the respective support elements. The spacings between the axes about which the rake wheels rotate may be substantially uniform along the respective support elements, and may be fixed. The mounting locations of the rake wheels on the corresponding support element may be such that the circumferences of the rake wheels overlap each other when viewed from a horizontal perspective, and in some implementations the periphery of the rake wheel may substantially reach the rotational axis of a rake wheel mounted adjacent on the support element. Each of the rake wheels 80, 82 may be positioned on the inward side 74 of the support element 64, 66.

Each of the rake wheels 80, 82 may be mounted on a respective support element 64, 66 by a linking member 86, with each of the rake wheels being rotatably mounted on a respective one of the linking members. Each linking member may mount a rake wheel at an angle with respect to the longitudinal axis 70 of the respective support element. Each of the rake wheels may extend in a substantially vertical rake wheel plane, and the rake wheel planes may be oriented substantially parallel to each other and may be oriented at an angle with respect to the longitudinal axis 70 of the support element. The angles may be uniform between all of the rake wheels. Illustratively, measurement of the angle between the plane of the rake wheel and the longitudinal axis 70 may range from approximately 15 degrees to approximately 30 degrees, although angles with other measurements may also be utilized.

In the merge configuration of the implement 10, such as is illustratively shown in FIG. 1, the rake wheels may be supported on the frame in a manner such that the rake wheel planes are oriented to diverge toward the front 22 of the frame and converge toward the rear 23 of frame. In the turn configuration of the implement, such as is illustratively shown in FIG. 2, the rake wheels may be supported by the frame 20 in a manner such that the rake wheel planes of the rake wheels are oriented to diverge toward the front of the frame and converge toward the rear of the frame on the frame 20. In the fluff configuration of the implement 10, such as is illustratively shown in FIG. 3, the rake wheels may be supported by the frame in a manner such that the rake wheel planes of the rake wheels are oriented substantially parallel to the central longitudinal axis 12 of the implement, or may have a slight degree of convergence toward the front of the frame and a corresponding slight degree of divergence toward the rear of the frame.

The implement 10 may further include a plurality of support wheels 90, 92 mounted on the frame 20 to rest upon the surface of the field to support the frame in an elevated condition above the field surface. Each of the support wheels 90, 92 may be mounted on the primary frame structure 30 of the frame. At least one of the support wheels may be located on each lateral side of the central longitudinal axis 12 such that at least one support wheel is located on the opposite lateral sides. The plurality of support wheels 90 may comprise a pair 90, 91 of the support wheels located on one lateral side of the central longitudinal axis 12 and another pair 92, 93 of the support wheels located on the other lateral side of the central longitudinal axis. In some embodiments, each of the support wheels 90, 91, 92 and 93 is mounted on a stub axle 98.

In other aspects, the disclosure relates to a support wheel suspension structure 100 for mounting at least one of the support wheels on the primary frame structure 30 and suspends the frame 20, as well as elements mounted on the frame, in a manner that reduces the transmission to the frame any shocks and bumps experienced by the support wheels as the wheels travel over the field surface. A pair of the support wheel suspension structures 100 may each mount one of the support wheels, or a pair of the support wheels, on the primary frame structure 100 at locations lateral to the axis 12. The support wheel suspension structure 100 may comprise a base bracket 102 which is mounted on the frame 20. The base bracket being mounted on the underside of the primary frame structure 30 and extend downwardly from the structure 30. The support wheel suspension structure 100 may also comprise a link arm 104 mounted on the base bracket 102, and may be movably mounted on the bracket 102. The link arm 104 may be pivotable with respect to the base bracket, and may pivoting with respect to the base bracket about a substantially horizontal axis. The link arm 104 may be pivotally mounted on the base bracket by a linking pin 106 mounted on the base bracket 102 and the link arm.

The support wheel suspension structure 100 may further include a walking beam 110 which is movably mounted on the link arm 104, and may be pivotally mounted on the link arm. The walking beam 110 may have opposite beam ends 112, 113, and an intermediate pivot mount pin 114 may be mounted on the walking beam and the link arm to mount the walking beam on the link arm. The intermediate pivot mount pin 114 may be mounted on the walking beam 110 at a location intermediate of the opposite beam ends 112, 114. The intermediate pivot mount pin 114 may extend through the walking beam, and may mount on the link arm. One of the support wheels being mounted on the walking beam toward each of the opposite beam ends, and the stub axle associated with the support wheel may extend between the support wheel and the walking beam to mount the support wheel on the walking beam.

The support wheel suspension structure 100 may also include a damping element 120 configured to damp pivotal movement of the link arm 104 with respect to the base bracket 102. The damping element 120 may be positioned between a mount portion 122 of the base bracket 102 and a mount portion 124 of the link arm 104. The damping element 120 may be compressed between the mount portions 122, 124 of the base bracket and link arm by the weight of the frame 20, as well as other elements of the implement mounted on the frame. The damping element 120 may tend to resist compression of the damping element between the mount portions 122, 124, and in some embodiments may comprise a helical compression spring, although other compression resisting elements may be utilized. The damping element 120 may be mounted on the mount portion 122 of the base bracket and mounted on the mount portion 124 of the link arm and optionally may provide a degree of resistance to movement of the mount portions 122, 124 away from each other. The damping element 120 may have a position offset from an axis passing through the linking pin 106 and the intermediate pivot mount pin 114. In a suspension structure 100 that incorporates both the walking beam 110 as well as the damping element 120 influencing the movement of the link arm 104 with respect to the base bracket, a combination of suspension structures is achieved that provides a greater reduction of the magnitude of shock forces transmitted from the support wheels to the frame than with no suspension or suspensions employing only a single suspension technique.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An implement for moving plant material lying in a field, the implement having a central longitudinal axis oriented substantially parallel to a forward movement direction of the implement, the implement comprising:
    a frame;
    a plurality of rake wheels configured to engage plant material lying in the field upon movement of the implement across the field, each of the rake wheels having a plurality of substantially radially extending tines for engaging the plant materials, each of the rake wheels being rotatably mounted on the frame; and
    a plurality of support wheels mounted on the frame to rest upon a field surface of the field to support the frame in an elevated condition above the field surface;
    wherein the implement has a plurality of configurations, the plurality of configuration including:
        a merge configuration in which the frame is configured to support the plurality of rake wheels in a manner such that the rake wheels merge windrows of plant material on the field surface by lateral displacement of the plant material on the field surface;
        a turn configuration in which the frame is configured to support the plurality rake wheels in a manner such that the rake wheels turn the plant material situated in windrows having a first lateral spacing on the field surface with a degree of lateral inward movement of the plant material effective to produce laterally separated windrows in a second lateral spacing on the field surface which is closer together than the first lateral spacing; and
        a fluff configuration in which the frame is configured to support the plurality of rake wheels in a manner such that the rake wheels lift plant material off of the field surface without lateral displacement of the plant material on the field surface in a direction lateral to the central longitudinal axis of the implement.

2. The implement of claim 1 wherein the frame comprises:
    a primary frame structure extending laterally with respect to the central longitudinal axis and having opposite lateral ends; and
    a pair of secondary frame structures mounted on the primary frame structure, the secondary frame structures being located toward the lateral ends of the primary frame structure, the secondary frame structures being movable with respect to the primary frame structure.

3. The implement of claim 2 wherein the primary frame structure is laterally extendable from a retracted width to an extended width, the extended width being greater than the retracted width.

4. The implement of claim 3 wherein the primary frame structure comprises:
    a central element with outer ends;
    a pair of lateral elements with each of the lateral elements having one of the opposite lateral ends of the primary frame structure, each of the lateral elements being movable in a laterally outward direction with respect to the central element between a retracted position and an extended position, the retracted positions of the lateral elements corresponding to the retracted width of the primary frame structure and the extended positions of the lateral elements corresponding to the extended width of the primary frame structure.

5. The implement of claim 4 wherein the lateral elements of the primary frame structure are extendable and retractable with respect to the central element of the primary frame structure.

6. The implement of claim 4 wherein each of the lateral elements is extendable laterally outward from one of the outer ends of the central element.

7. The implement of claim 4 wherein portions of the central element toward the outer ends are hollow, each of the lateral elements being telescopically extendable from the central element such that the lateral elements and the central element maintain a substantially linear relationship with respect to each other in the retracted position and the extended position.

8. The implement of claim 2 wherein each of the secondary frame structures of the frame comprises:
   an inner arm element movably mounted on the primary frame structure at a respective one of the opposite lateral ends; and
   a support element mounted on the primary frame structure by the inner arm element, the support element being movably mounted on the inner arm element.

9. An implement for moving plant material lying in a field, the implement having a central longitudinal axis oriented substantially parallel to a forward movement direction of the implement, the implement comprising:
   a frame;
   a plurality of rake wheels configured to engage plant material lying in the field upon movement of the implement across the field, each of the rake wheels having a plurality of substantially radially extending tines for engaging the plant materials, each of the rake wheels being rotatably mounted on the frame; and
   a plurality of support wheels mounted on the frame to rest upon a field surface of the field to support the frame in an elevated condition above the field surface;
   wherein the implement has a plurality of configurations, the plurality of configuration including a merge configuration configured to merge windrows of plant material on the field surface by lateral displacement of the plant material on the field surface, the plurality of configurations including a turn configuration configured to turn the plant material on the field surface with a degree of lateral movement of the plant material on the field surface, and the plurality of configurations including a fluff configuration configured to lift plant material off of the field surface without lateral displacement of the plant material on the field surface;
   wherein the frame comprises:
      a primary frame structure extending laterally with respect to the central longitudinal axis and having opposite lateral ends; and
      a pair of secondary frame structures mounted on the primary frame structure, the secondary frame structures being located toward the lateral ends of the primary frame structure, the secondary frame structures being movable with respect to the primary frame structure;
   wherein each of the secondary frame structures of the frame comprises:
      an inner arm element movably mounted on the primary frame structure at a respective one of the opposite lateral ends; and
      a support element mounted on the primary frame structure by the inner arm element, the support element being movably mounted on the inner arm element; and
   wherein each of the inner arm elements has at least two positions including an outward position and an inward position, the outward position corresponding to the merge configuration of the implement, the outward position corresponding to the turn configuration of the implement, the inward position corresponding to the fluff configuration of the implement.

10. The implement of claim 9 wherein each of the inner arm elements is elongated with a first end and a second end, the first end being pivotally mounted on the primary frame structure such that the second end is swingable in an arc with respect to the first end when the inner arm element is pivoted with respect to the primary frame structure.

11. The implement of claim 10 wherein the inward position of each of the inner arm elements is characterized by the second end of the inner arm element being relatively closer to the central longitudinal axis and the outward position of each of the inner arm elements is characterized by the second end of the inner arm element being relatively further from the central longitudinal axis.

12. The implement of claim 8 wherein the support element of each secondary frame structure is elongated with a forward end and a rearward end and a longitudinal axis extending between the forward and rearward ends, the forward end being generally positioned toward the front of the frame and the rearward and being positioned toward the rear of the frame; and
   wherein the support element of each secondary frame structure has a mounting point located between the forward end and rearward end, a second end of the inner arm element being mounted on the support element at the mounting point.

13. The implement of claim 12 wherein the support element has at least two positions including an open position and a closed position, the closed position being characterized by the forward end of the support element being located relatively closer to the central longitudinal axis, the open position being characterized by the forward end of the support element being located relatively further from the central longitudinal axis.

14. The implement of claim 13 wherein the open position of the support element corresponds to the merge configuration of the implement, the open position of the support element corresponds to the turn configuration of the implement, and the closed position of the support element corresponds to the fluff configuration of the implement.

15. The implement of claim 2 wherein each rake wheel of the plurality of rake wheels is rotatably mounted on a respective one of the secondary frame structures at spaced locations on a support element of the secondary frame structure.

16. The implement of claim 15 wherein each of the rake wheels extends in a rake wheel plane, the rake wheel planes of the rake wheels on a said secondary frame structure being oriented substantially parallel to each other.

17. The implement of claim 16 wherein, in the merge configuration of the implement, the rake wheels are supported by the frame in a manner such that the rake wheel planes of the rake wheels are oriented to diverge toward a front of the frame and converge toward a rear of the frame implement;
   wherein, in the turn configuration of the implement, the rake wheels are supported by the frame in a manner such that the rake wheel planes of the of the rake wheels are oriented to diverge toward the front of the frame and converge toward the rear of the frame implement; and
   wherein, in the fluff configuration of the implement, the rake wheels are supported by the frame in a manner such that the rake wheel planes of the rake wheels are oriented substantially parallel to the central longitudinal axis of the implement.

18. The implement of claim 2 wherein movement of elements of the implement required to change the implement from one said configuration of the implement to another said configuration of the implement does not require vertical movement of the primary frame structure such that the primary frame structure remains at substantially the same vertical level during movement of the elements of the implement between configurations of the implement.

19. The implement of claim 18 wherein each of the secondary frame structures is movable with respect to the primary frame structure; and wherein movement of elements of the implement required to change the implement from one said configuration of the implement to another said configuration of the implement does not require vertical movement of the secondary frame structure such that the secondary frame structure remains at substantially the same vertical level during movement of the elements of the implement between configurations of the implement.

20. The implement of claim 1 wherein the implement includes a pair of lateral material engagement assemblies each positioned on opposite lateral sides of the central longitudinal axis of the implement.

21. An implement for moving plant material lying in a field, the implement having a central longitudinal axis oriented substantially parallel to a forward movement direction of the implement, the implement comprising:

a frame;

a plurality of rake wheels configured to engage plant material lying in the field upon movement of the implement across the field, each of the rake wheels having a plurality of substantially radially extending tines for engaging the plant materials, each of the rake wheels being rotatably mounted on the frame; and a plurality of support wheels mounted on the frame to rest upon a field surface of the field to support the frame in an elevated condition above the field surface;

wherein the implement has a plurality of configurations, the plurality of configuration including:

a merge configuration in which the frame is configured to support the plurality of rake wheels in a manner such that the rake wheels merge windrows of plant material on the field surface by lateral displacement of the plant material on the field surface;

a turn configuration in which the frame is configured to support the plurality rake wheels in a manner such that the rake wheels turn the plant material situated in windrows having a first lateral spacing on the field surface with a degree of lateral inward movement of the plant material effective to produce laterally separated windrows in a second lateral spacing on the field surface which is closer together than the first lateral spacing; and a fluff configuration in which the frame is configured to support the plurality of rake wheels in a manner such that the rake wheels are oriented substantially parallel to the central longitudinal axis of the implement to lift plant material off of the field surface without lateral displacement of the plant material on the field while preserving lateral positioning of windrows of the plant material on the field surface.

* * * * *